Jan. 12, 1965   R. BAERISWYL   3,165,171
CONTROL SYSTEM FOR WHEEL FLANGE LUBRICATORS
Filed June 22, 1962   5 Sheets-Sheet 3
FIG.7
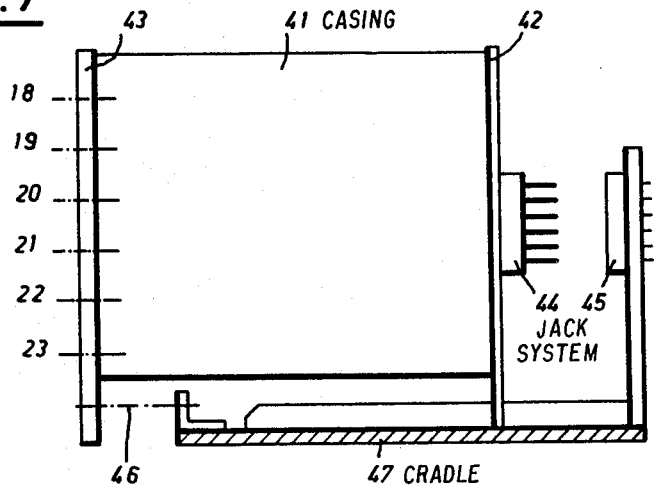
FIG.8
FIG.10
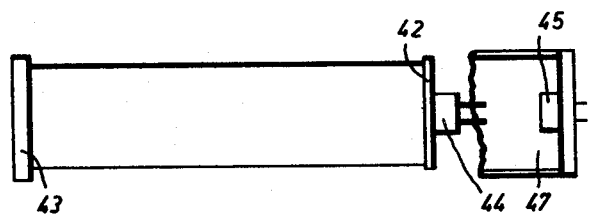
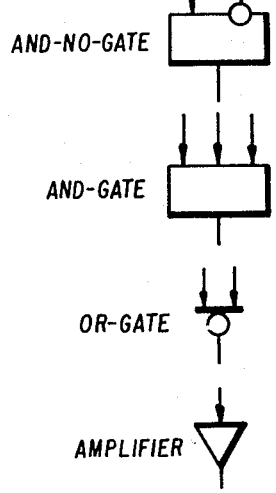
FIG.11
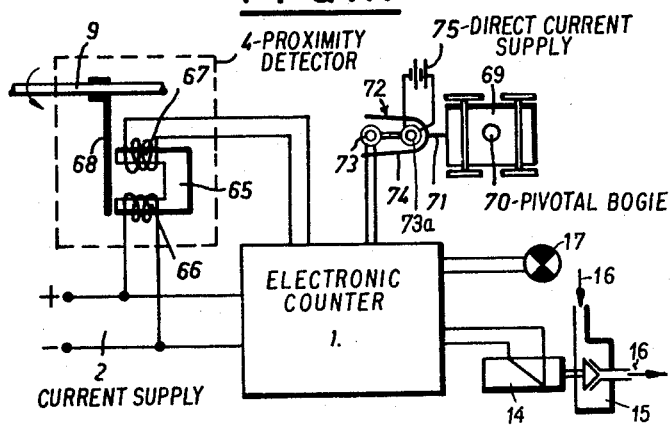
INVENTOR
Roger Baeriswyl
BY J. Delattre-Seguy
ATTORNEY

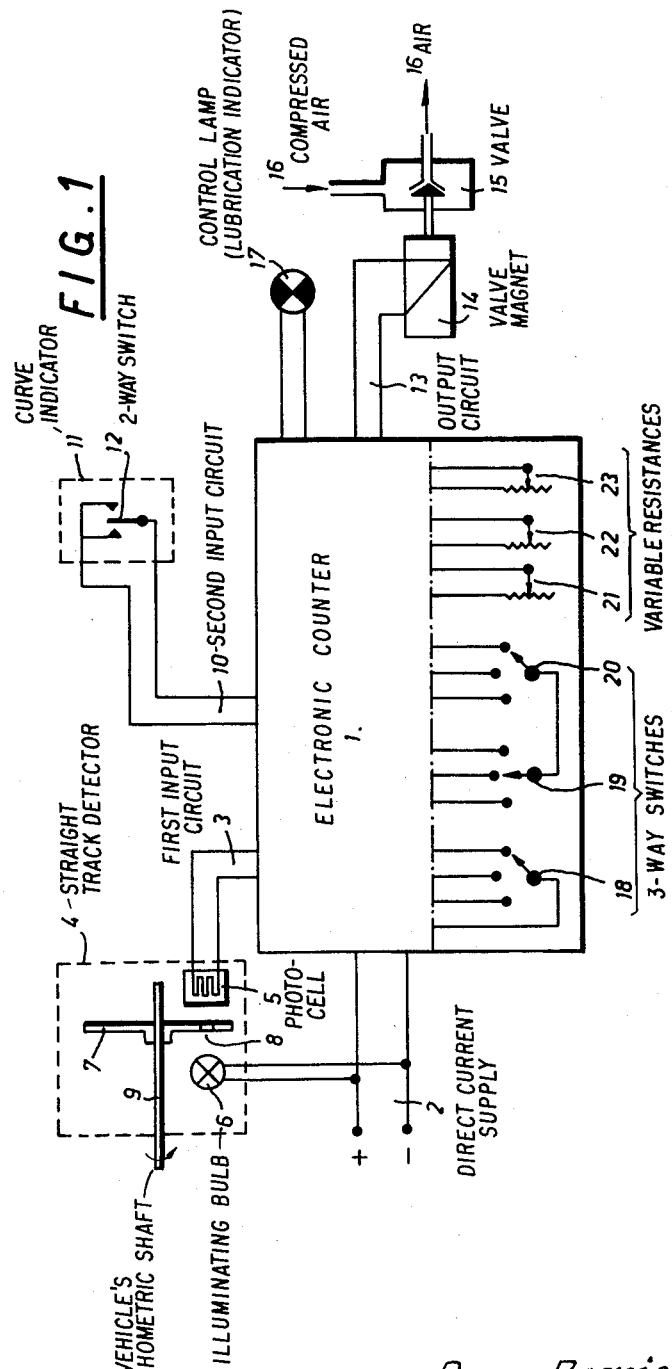

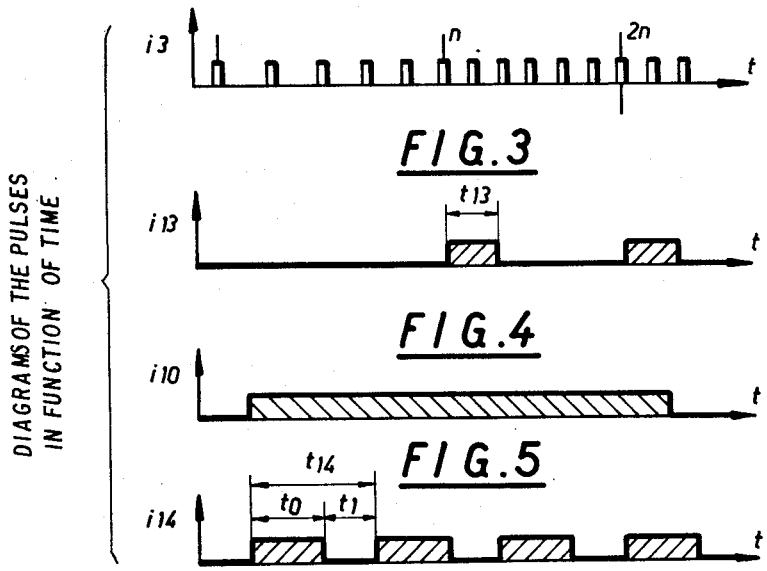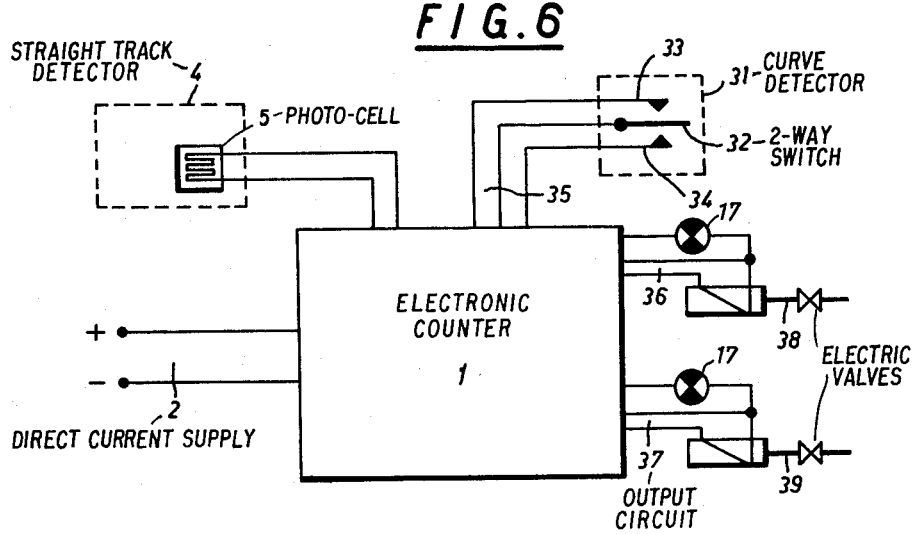

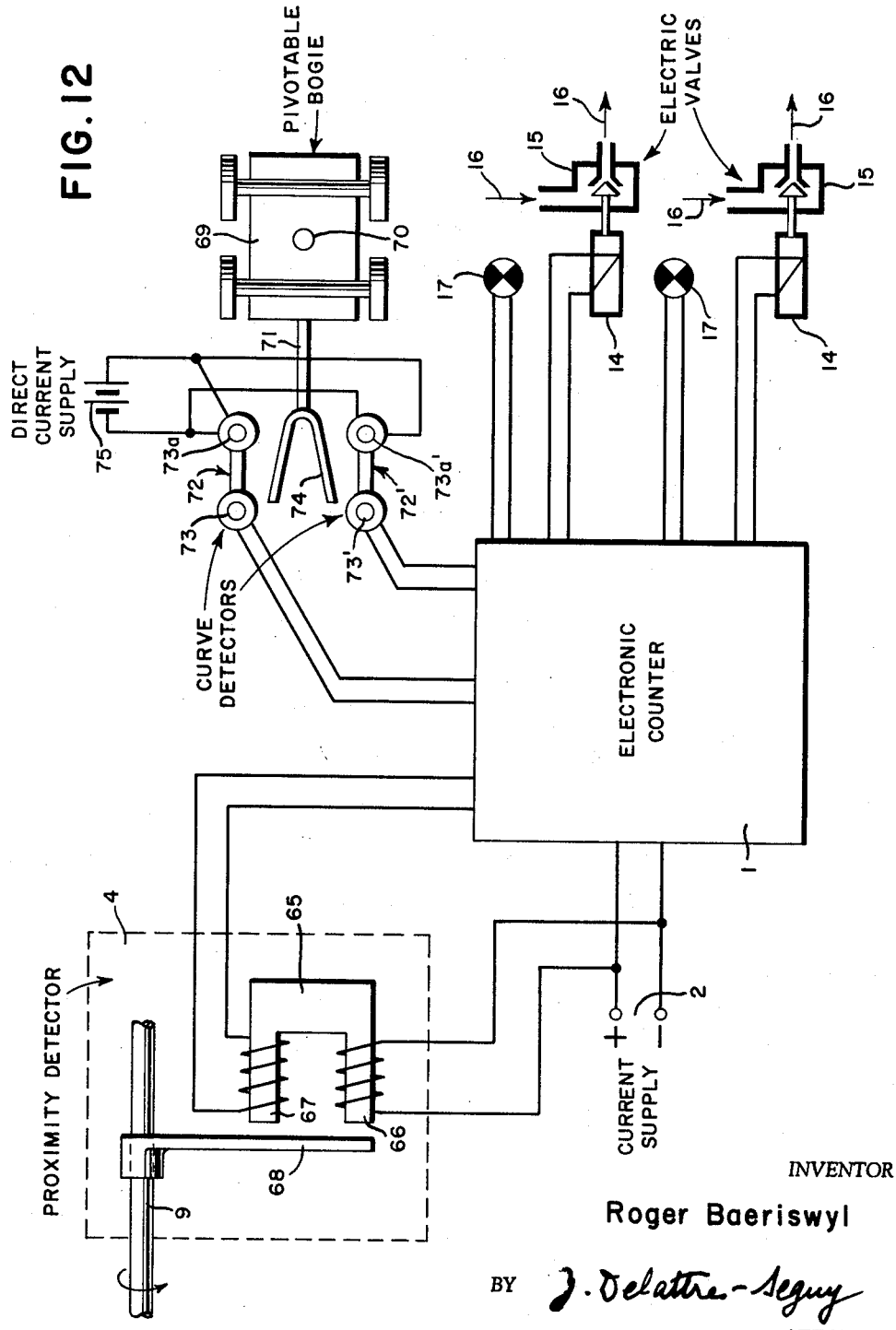

United States Patent Office 3,165,171
Patented Jan. 12, 1965

3,165,171
CONTROL SYSTEM FOR WHEEL FLANGE
LUBRICATORS
Roger Baeriswyl, Geneva, Switzerland, assignor to Metravel S.A., Geneva, Switzerland, a Swiss company
Filed June 22, 1962, Ser. No. 204,538
Claims priority, application Switzerland, June 23, 1961, 7,424/61
9 Claims. (Cl. 184—3)

The present invention has for its object a control system for the lubrication of the flanges of railway vehicle wheels, chiefly in the case of locomotives and rail motor cars, the actual lubricating mechanism of which is actuated by one or more electrically controlled valves; according to the invention, said system includes an electronic counter comprising a first input circuit controlled by a detector of straight track sections supplying direct current pulses the number of which is proportional to the distance travelled over, while the electronic counter supplies for a predetermined number $n$ of incoming linear pulses one output pulse feeding the electrically controlled valve and said counter is provided furthermore with means for adjusting said number $n$ of input pulses and with a second input circuit connected with a curve detector supplying a pulse as soon as a curve of the track is recorded in the track, said pulse producing in the output circuit of the electronic counter periodical pulses feeding the electrically controlled valve whenever the frequency of the linear pulses is higher than a predetermined frequency.

The accompanying drawings illustrate, by way of example, various embodiments of a system according to the invention. In said drawings:

FIG. 1 is a diagrammatic showing of a first embodiment.

FIGS. 2 to 5 are different diagrams showing the electric pulses as functions of time and serve for illustrating the operation of the arrangement.

FIG. 6 is a diagrammatic showing of a second embodiment,

Figure 9:
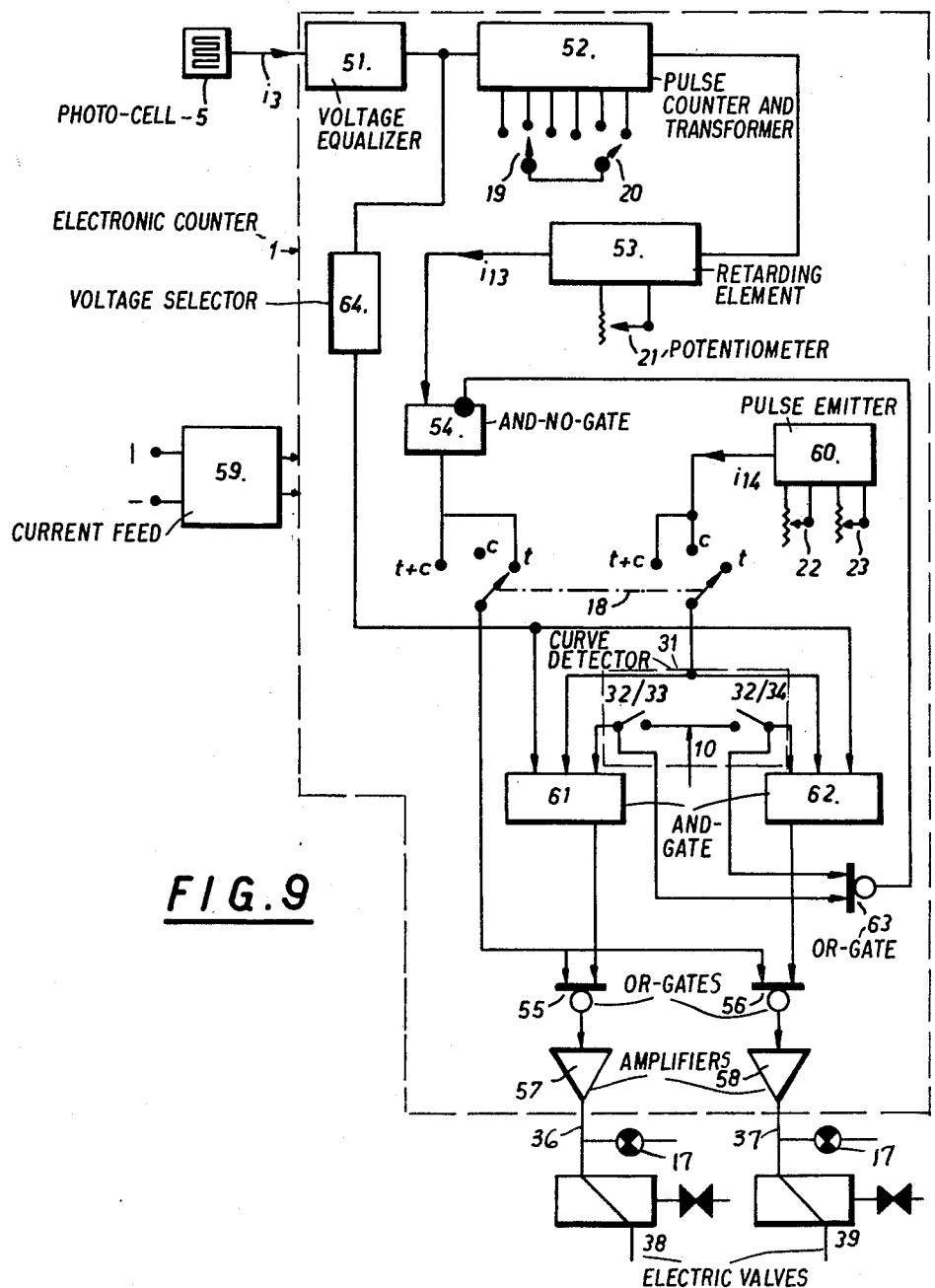

FIGS. 7 and 8 being elevational and plan views of means incorporated with said arrangement.

FIG. 9 is a wiring diagram of the embodiment according to FIG. 6.

FIG. 10 is a chart of the logical symbols used in the wiring diagram.

FIG. 11 shows a proximity detector.

FIG. 12 illustrates an electronic counter provided with two curve detectors.

In FIG. 1 is illustrated an electronic counter 1 fed by a supply of direct current 2 and including a first input circuit 3 connected with and fed by a detector 4 of straight track sections; said detector is constituted by an illuminating bulb 6, a disc 7 provided with a perforation at 8 and rigid with the tachometric shaft 9 of the vehicle. A second input circuit 10 for the counter 1 is connected with a curve indicator 11 illustrated diagrammatically by a two-way switch provided with a central blade 12 adapted to oscillate towards the left-hand side or towards the right-hand side according to the direction of the curve.

The output circuit 13 of the electronic counter 1 is connected with an electrically controlled valve constituted by an electromagnet 14 and a valve 15. When the electromagnet 14 is energized, the valve 15 opens and allows the passage of compressed air in the direction of the arrows 16 to feed the distributor of lubricating oil. A witness lamp 17 inserted in parallel with the electromagnet 14 serves as a lubrication indicator.

The electronic counter 1 includes furthermore a three-way switch 18 which allows connecting it either with the straight track detector 4 or with the curve detector 11 or with both detectors simultaneously. In this latter case, as soon as the curve detector operates, the electronic counter selects automatically the indications given out by the curve detector and returns to the connections giving out the indications of the straight track detector 4 whenever no curve is recorded.

The electronic counter 1 includes furthermore two three-way switches 19 and 20 and three variable resistances 21, 22, 23 of which the operation will be described hereinafter.

The operation of the system described is as follows:

When the vehicle moves, the tachometric shaft 9 is shifted angularly by distances proportional to the distance travelled over and for each revolution of the shaft 9 and of the disc 7, the passage of the perforation 8 in front of the photo-cell 5 provides an electric pulse in the input circuit 3.

Said pulses $i3$ fed by the straight track detector 4 are shown in FIG. 2 as functions of time. For a predetermined number $n$, $2n$, . . . $kn$ of pulses, the electronic counter 1 feeds into the output circuit 13 output pulses $i13$ of a duration $t13$ (FIG. 3) which feed the electromagnet 14 of the electrically controlled valve. These output pulses open the valve 15 and ensure thus the lubrication of the wheel flanges after each unitary distance travelled over, as defined by the number $n$ and during a time $t13$.

When the vehicle runs along a curve and if its speed is sufficiently high, the switch 12 closes and supplies a curve impulse $i10$ to the input circuit 10 of the electronic counter 1, which impulse lasts throughout the duration of the recording of the curve and is drawn as a function of time in FIG. 4.

The electronic counter 1 which records the pulse $i10$ supplies the output circuit 13 with periodical pulses $i14$ at a periodicity $t14$. The output pulses $i14$ open the valve 15 and provide for the periodical lubrication of the wheel flanges during the operative periods $t0$ followed by an inoperative period $t1$.

The two switches 19 and 20 of the electronic counter 1 allow adjusting the above-defined number $n$ of linear pulses with a view to modifying the distance travelled over by the vehicle between two succesive lubrications. The six positions illustrated allow selecting six different values for the number $n$. With the connections illustrated including two switches inserted in series, the switch 19 allows selecting three numbers $n$ corresponding for instance to three types of tachometers and, consequently, of tachometric shafts 9, so as to obtain for any of these types of tachometers a lubrication of equal sections of the track, while the switch 20 allows adjustment for the length of said sections of the track.

The three variable resistances 21, 22, 23 serve for adjusting respectively the duration of the periods $t13$, $t0$ and $t1$ (FIGS. 3 and 5).

FIG. 6 illustrates a modification of the electronic counter 1 which is fed by a supply of direct current 2. This includes furthermore a detector 4 of straight track sections, a curve detector 31 including two switches 32, 33 and 32, 34. The central blade 32 rocks when a curve is being recorded so as to close either the switch 32–33 or the switch 32–34. The curve detector 31 is connected with the input circuit 35 of the electronic counter 1.

The electronic counter 1 feeds two output circuits 36 and 37 leading respectively to two electrically controlled valves 38 and 39. The electrically controlled valve 38 controls the lubrication of the left-hand wheels of the vehicle, whereas the electrically controlled valve 39 controls the lubrication of the right-hand wheels of the vehicle.

The operation of the arrangement described is similar to that of the arrangement described with reference to FIG. 1.

The impulses of the straight line detector 4 produce output pulses *i*13 (FIG. 3) in both output circuits 36 and 37 which provide for the lubrication respectively of the left-hand and right-hand wheels of the vehicle.

Along an incurved track, the closing of the switch 32–33 of the curve detector 31 produces output pulses *i*14 (FIG. 5) in the output circuit 36, whereas the closing of the switch 32–34 produces output pulses *i*14 in the corresponding output circuit 37. Thus, whatever may be the direction of rotation of the vehicle, only the wheels on the outside of the curve are lubricated.

There is illustrated in FIGS. 7 and 8 an apparatus carrying the arrangement described and which includes a casing 41 provided with a rear panel 42 and a front panel 43. To the rear panel 42 is secured a jack system 44 providing for the electric connections outside the apparatus. To the front panel 43 are secured all the control members such as the switches 18, 19 and 20 and the variable resistances 21, 22, 23. A cradle 47 secured to the vehicle carries the female sockets 45 and forms a support for the apparatus casing 41, which may be fitted through its jacks over the sockets and then held fast on the cradle by fastening means illustrated diagrammatically at 46.

Turning to FIG. 9, the latter shows as a block diagram the arrangement described with reference to FIG. 6 wherein the block symbols are those appearing on the chart of FIG. 10.

The logical elements shown on FIG. 10 have the following functions: The element ET-NON (AND-NO-gate) delivers an output signal only when the first inlet, symbolized by an arrow, receives an input signal and when the second inlet, symbolized by a circle, does not receive any input signal.

The element ET (AND-gate) delivers an output signal only when the three inputs, symbolized by arrows, receive input signals.

The element ET (OR-gate) delivers an output signal when either one or the other of the inlets, symbolized by arrows, receives an input signal.

At the bottom of FIG. 10, the triangular symbol indicates a signal amplifier.

The electronic counter designated on FIG. 6 by the reference number 1 is represented in detail in FIG. 9. A comparison of FIG. 9 with FIG. 6 permits to recognize on FIG. 9 the photo-electric cell 5 which delivers the pulses *i*3 to the counter. On the other hand, the signals emitted by the curve detector 31 (FIG. 6) are sent to said counter 1; said curve detector 31 is also symbolized in FIG. 9 by the contacts or switches 32, 33 on the one hand and 32, 34 on the other hand. On FIG. 9 there are also shown the two output circuits 36 and 37 of the electronic counter, which are controlled by the electrically controlled valves 38 and 39.

According to FIG. 9, the electronic counter comprises the following structural elements:

A voltage controller and equalizer 51, which limits the amplitude of the input pulses *i*3 of the photo-electric cell 5 to a determined value of the voltage;

A pulse-counting and transforming element 52, which counts the input pulses *i*3 and delivers output pulses *i*13 (FIG. 3) in correlation with the number of the pulses *i*3; said element 52 is equipped with three-way switches 19 and 20, which serve to adjust the desired number N of pulses and to adjust the distance traveled by the vehicle between two desired lubrications;

A retarding or relaxing element 53 provided with a potentiometer 21; said element 53 permits to regulate the duration of the output pulses *i*13 (FIG. 3);

A pulses emissive element 60, emitting the pulses *i*14 (FIG. 5), the frequency and length of which can be controlled by the two variable resistances or potentiometers 22 and 23;

An element 64, measuring the frequency of the current pulses *i*3 (FIG. 2) and giving a signal of output when the value of said frequency exceeds a predetermined value;

And finally a series of elements described with reference to FIG. 10.

In FIG. 9, the reference numeral 59 designates the means for feeding the current to all the elements of the electronic counter 1.

The function of the electronic counter of FIG. 9 is as follows:

The selector switch 18 can be set in either one of the three positions shown (FIG. 9): a position *t* corresponding to a rectilinear track, a position *c* corresponding to a curve, and a position *t*+*c*, corresponding to a rectilinear track and to a curve.

If the selector switch 18 takes the position *t*, the function of the curved detector 31 is without effect. The pulses *i*13 of the electronic counter are directed to the element ET-NON (AND-NO-GATE) 54 and reach through elements OU (OR-GATE) 55 and 56 the amplifiers 57 and 58, the outlets of which feed the electric valves 38 and 39.

If the selector switch 18 takes the position *c*, the pulse emitting element 60 is then connected and the periodic pulses *i*14 (FIG. 5) which it sends are directed to the two elements ET (AND-GATE) 61 and 62. When the speed of the vehicle, and consequently the pulse frequency of pulses *i*3, are sufficiently great, element 64 emits an output signal which is also directed to the two elements 61 and 62; under these conditions, when the vehicle goes over a curve, and, for instance, the contacts 32, 33 are closed, they permit the passage of a pulse *i*10 (FIG. 9) towards the element 61, then the electro-valve 38 is excited by element 61, element 55 and amplifier 57; on the other hand, the closing of contacts 32, 34 promote the excitation of electro-valve 39 through elements 62, 56 and amplifier 58.

Finally, if the selector switch 18 takes the position *t*+*c*, the pulse emitting element 60 is also connected. The contacts 32, 33 and 32, 34 of the curve detector 31 remain open on a rectilinear track; then, the element OU (OR-Gate) 63 is not fed, the element ET-NON (AND-NO-GATE) 54 is excited and the current pulses *i*13 can go farther, as in the case of the position *t* of the selector switch 18. When one of the pairs of contacts 32, 33 and 32, 34 closes during the passage of a curve, the element OU (OR-GATE) 63 is fed and its output signal, delivered to the element ET-NON (AND-NO-GATE) 54, prevents the passage of the pulse *i*13 through said element 54. On the other hand, the pulses *i*14 are directed as for the position *c* of the selector switch 18 towards the corresponding electro-valves 38 and 39.

The detector of straight tracks incorporating a photo-cell may be replaced by any other type of detector, for instance a proximity detector of the type illustrated in FIG. 11. Such a detector includes, in a well-known manner, an open magnetic circuit 65 of which one arm carries a winding 66 connected with a supply of direct current, for instance, as illustrated, the same supply 2 as that feeding the electronic counter 1, while the other arm carries a winding 67 connected with the voltage equalizer 51 for the counter 1 (FIG. 9) instead of the photo-cell used in the precedingly disclosed embodiment.

The proximity detector includes furthermore a movable armature 68 rigid with the tachometric shaft 9 of the vehicle, so as to be brought periodically over the core of the circuit 65 through rotation of said shaft. Thus, each time the armature 68 passes over said core, the reluctance of the path provided for the lines of force between the two arms of the magnetic circuit is sufficiently reduced so that the magnetic flux may be established in the magnetic circuit in a manner such as will induce a voltage in the winding 67. Of course, the value of said voltage will vary according as to whether the armature 68 extends directly over the core of the circuit 65 or, in contradistinction, lies at a slight distance therefrom. Said voltage will be practically zero during a large fraction of the angular movement of the armature 68.

Said proximity detector may obviously serve also for detecting the progression over a curve of the vehicle; in this case, it replaces the arrangements 11 and 31 of FIGS. 1 and 6 respectively. As a matter of fact, it is possible, for instance to pivotally secure at 70 to the vehicle which is not illustrated a bogie 69 provided with a forked rod 71, the arms 74 of which form each a yoke or armature closing magnetically a circuit 72 similar to the above-mentioned circuit 65 and rigid with the vehicle body, the winding 73 cooperating with said armature being connected with the counter 1 and the winding 73a with a supply of direct current 75; each shifting of one of the arms 74 of the forked rod 71 above the circuit 72 provides a pulse feeding the counter 1.

Such an arrangement may obviously be made more complete, as shown in FIG. 12, by arranging two magnetic circuits, similar to the circuit described in connection with FIG. 11, respectively to either side of the fork 71, each circuit being provided with an independent energizing winding and a collector winding so as to feed selectively each a pulse into the counter 1 only when the vehicle turns in a corresponding direction. One circuit 72 comprises windings 73 and 73a; the second circuit 72' comprises windings 73' and 73a'. This arrangement allows therefore the lubrication of the wheels carried at one end of an axle, independently of the wheels carried at the other end of the axle.

Preferably, the described electronic counter will be equipped with transistors, in a well known manner, and the advantages of which, compared with electro-mechanical contacts and with electronic tubes, are well known in the vehicles' service. With transistors, the feeding of the current should be obtained with a voltage lower than about 50 volts.

What I claim is:

1. A system for controlling the lubrication of the flanges of the wheels of a railway vehicle, comprising an electronic counter, a first input circuit for said counter, a detector of the passage of the vehicle over a straight line track, including means supplying the counter through said first input circuit with linear pulses of current, at a frequency the value of which is in an adjustable linear ratio with the distance travelled over, a second input circuit feeding said counter, a curve detector supplying a pulse through said second input circuit to the counter during the passage of the vehicle over a curve, an output circuit system for the counter, at least one electrically controlled valve fed by said output circuit system and controlling the flow of lubricant to the vehicle wheels, said electronic counter including means whereby the electronic counter supplies an output pulse into the said output circuit system to operate the corresponding valve each time a predetermined number $n$ of pulses from the first input circuit has been received by said counter, means for adjusting said number $n$, and means whereby the input of a pulse from the second input circuit into the counter produces in the output circuit system of the electronic counter further periodical pulses energizing the corresponding valve whenever the frequency of the pulses from the first input circuit is higher than a predetermined value.

2. A system for controlling the lubrication of the flanges of the wheels of a railway vehicle, comprising an electronic counter, a first input circuit for said counter, a detector of the passage of the vehicle over a straight line track including means supplying the counter through said first input circuit with linear pulses of current, at a frequency the value of which is in adjustable linear ratio with the distance travelled over, a second input circuit feeding said counter, a curve detector supplying a pulse through said second input circuit to the counter during the passage of the vehicle over a curve, an output circuit system for the counter, at least one electrically controlled valve fed by said output circuit system and controlling the flow of lubricant to the vehicle wheels said electronic counter including means whereby the electronic counter supplies an output pulse into said output circuit system to operate the corresponding valve each time the corresponding number $n$ of pulses from the first input circuit has been received by said counter, means for adjusting said number $n$, means for adjusting the duration of said output pulses fed into the output circuit system, means whereby the input of a pulse from the second input circuit into the counter produces in the output circuit system of the electronic counter further periodical pulses energizing the corresponding valve whenever the frequency of the pulses from the first input circuit is higher than a predetermined value, and means for adjusting the periodicity and the duration of said further pulses in the output circuit system.

3. A system for controlling the lubrication of the flanges of the wheels of a railway vehicle, comprising an electronic counter, a first input circuit for said counter, a detector of the passage of the vehicle over a straight line track including means supplying the counter through said first input circuit with linear pulses of current at a frequency the value of which is in an adjustable linear ratio with the distance travelled over, a second input circuit feeding said counter, a curve detector supplying a pulse through said second input circuit to the counter during the passage of the vehicle over a curve, means whereby the curve detector is adapted to record the direction of the curve, two output circuits, at least one electrically controlled valve fed respectively by each of said output circuits and adapted respectively to produce the lubrication of the wheels on the corresponding side of the vehicle, said electronic counter including means whereby the electronic counter supplies an output pulse into said output circuits to operate the corresponding valve each time a predetermined number $n$ of pulses from the first input circuit has been received by said counter, means for adjusting said number $n$, means whereby the input of a pulse from the second input circuit into the counter produces in the output circuit corresponding to the recorded direction of the curve, further periodical pulses energizing the corresponding valve whenever the frequency of the pulses from the first input circuit is higher than a predetermined value, means for adjusting the duration of the output pulses fed into the output circuits, and means for adjusting the periodicity and the duration of the further pulses in the output circuits.

4. A system for controlling the lubrication of the flanges of the wheels of a railway vehicle, comprising an electronic counter, a first input circuit for said counter, a detector of the passage of the vehicle over a straight line track, and including a photo-cell, an electric lamp illuminating said cell, a perforated disc inserted between said lamp and said photo-cell and a tachometric shaft controlled by the running of the vehicle and constraining said perforated disc to rotate and to allow illumination of the photo-cell by the lamp through said perforation once per revolution, said photo-cell supplying the counter through said first input circuit with linear pulses of current at a frequency the value of which is in an adjustable linear ratio with the distance travelled over, a second input circuit feeding said counter, a curve detector supplying a pulse through said second input circuit to the counter during the passage of the vehicle over a curve, an output circuit system for the counter, at least one electrically controlled valve fed by said output circuit system and controlling the flow of lubricant to the vehicle wheels, said electronic counter including means whereby the electronic counter supplies an output pulse into said output circuit system to operate the corresponding valve each time a predetermined number *n* of pulses from the first input circuit has been received by said counter, means for adjusting said number *n*, and means whereby the input of a pulse from the second input circuit into the counter produces in the output circuit system of the electronic counter further periodical pulses energizing the corresponding valve whenever the frequency of the pulses from the first input circuit is higher than a predetermined value.

5. A system for controlling the lubrication of the flanges of the wheels of a railway vehicle including a body and a wheeled support pivotally carrying said body, comprising an electronic counter, a first input circuit for said counter, a detector of the passage of the vehicle over a straight line track and including means supplying the counter through said first input circuit with linear pulses of current at a frequency the value of which is in an adjustable linear ratio with the distance travelled over, a second input circuit feeding said counter, a curve detector controlled by the angular shifting between the vehicle body and its wheeled support and supplying a pulse through said second input circuit to the counter during the passage of the vehicle over a curve, an output circuit system for the counter, at least one electrically controlled valve fed by said output circuit system and controlling the flow of lubricant to the vehicle wheels, said electronic counter including means whereby the electronic counter supplies an output pulse into said output circuit system to operate the corresponding valve each time a predetermined number *n* of pulses from the first input circuit has been received by said counter, means for adjusting said number *n*, and means whereby the input of a pulse from the second input circuit into the counter produces in the output circuit system of the electronic counter further periodical pulses energizing the corresponding valve whenever the frequency of the pulses from the first input circuit is higher than a predetermined value.

6. A system for controlling the lubrication of the flanges of the wheels of a railway vehicle, comprising an electronic counter, a first input circuit for said counter, a proximity detector including a movable armature, a tachometric shaft controlled by the vehicle, controlling said armature and an electromagnetic system rigid with the vehicle and cooperating with said armature to supply the counter through said first input circuit with linear pulses of current at a frequency the value of which is in an adjustable linear ratio with the distance travelled over, a second input circuit feeding said counter, a curve detector supplying a pulse through said second input circuit to the counter during the passage of the vehicle over a curve, an output circuit system for the counter, at least one electrically controlled valve fed by said output circuit system and controlling the flow of lubricant to the vehicle wheels, said electronic counter including means whereby the electronic counter supplies an output pulse into said output circuit system to operate the corresponding valve each time a predetermined number *n* of pulses from the first circuit has been received by said counter, means for adjusting said number *n*, and means whereby the input of a pulse from the second input circuit into the counter produces in the output circuit system of the electronic counter further periodical pulses energizing the corresponding valve whenever the frequency of the pulses from the first input circuit is higher than a predetermined value.

7. In a system for controlling the lubrication of the flanges of the wheels of a railway vehicle, comprising a body and a wheeled support pivotally carrying said body, the provision of an electronic counter, a first input circuit for said counter, a detector of the passage of the vehicle over a straight line track, including means supplying the counter through said first input circuit with linear pulses of current at a frequency the value of which is in an adjustable linear ratio with the distance travelled over, a second input circuit feeding said counter, a curve detector including an armature rigid with the wheeled support, an electromagnetic system rigid with the body of the vehicle and cooperating with said armature to supply a pulse through said second input circuit to the counter during the passage of the vehicle over a curve, an output circuit system for the counter, at least one electrically controlled valve fed by said output circuit system and controlling the flow of lubricant to the vehicle wheels, said electronic counter including means whereby the electronic counter supplies an output pulse into said output circuit system to operate the corresponding valve each time a predetermined number *n* of pulses from the first input circuit has been received by said counter, means for adjusting said number *n*, and means whereby the input of a pulse from the second input circuit into the counter produces in the output circuit system of the electronic counter further periodical pulses energizing the corresponding valve whenever the frequency of the pulses from the first input circuit it higher than a predetermined value.

8. A system for controlling the lubrication of the flanges of the wheels of a railway vehicle, including a body and a wheeled support pivotally carrying said body, comprising an electronic counter, a first input circuit for said counter, a detector of the passage of the vehicle over a straight line track and including means supplying the counter through said first input circuit with linear pulses of current at a frequency the value of which is in an adjustable linear ratio with the distance travelled over, a second input circuit feeding said counter, two curve detectors including an armature rigid with the wheeled support, each curve detector including an electromagnetic system rigid with the vehicle body and cooperating with said armature to supply a pulse through said second input circuit to the counter, whenever the vehicle negotiates a curve in the direction corresponding to the curve detector considered during the passage of the vehicle over said curve, two output circuits, at least one electrically controlled valve fed respectively by each of said output circuits and adapted respectively to produce the lubrication of the wheels on the corresponding side of the vehicle, said electronic counter including means whereby the electronic counter supplies an output pulse into said output circuits to operate the corresponding valve each time a predetermined number *n* of pulses from the first input circuit has been received by said counter, means for adjusting said number *n*, means for adjusting the duration of said output pulses fed into the output circuit system, means whereby the input of a pulse from the second input circuit into the counter produces in the output circuit corresponding to the operative curve detector and consequently to the direction of the curve travelled over by the vehicle further periodical pulses energizing the corresponding valve whenever the frequency of the pulses from the first input circuit is higher than a predetermined value, and means for adjusting the periodicity and the duration of said further pulses in the output circuits.

9. A system for controlling the lubrication of the flanges of the wheels of a railway vehicle, comprising an electronic counter, a cradle, means for removably fitting the electronic counter on said cradle, a first input circuit for said counter, a detector of the passage of the vehicle over a straight line track and including means supplying the counter through said first input circuit with linear pulses of current at a frequency the value of which is in an adjustable linear ratio with the distance travelled over, a second input circuit feeding said counter, a curve detector supplying a pulse through said second input circuit to the counter during the passage of the vehicle over a curve, means whereby the curve detector is adapted to record the direction of the curve, two output circuits, at least one electrically controlled valve fed respectively by each of said output circuits and adapted respectively to produce the lubrication of the wheels on the corresponding side of the vehicle, said electronic counter including means whereby the electronic counter supplies an output pulse into said output circuits to operate the corresponding valve each time a predetermined number $n$ of pulses from the first input circuit has been received by said counter, means for adjusting said number $n$, means for adjusting the duration of said output pulses fed to the output circuit system, means whereby the input of a pulse from the second input circuit into the counter produces in the output circuit corresponding to the recorded direction of the curve further periodical pulses energizing the corresponding valve whenever the frequency of the pulses from the first input circuit is higher than a predetermined value, and means for adjusting the periodicity and the duration of said further pulses in the output circuits.

References Cited by the Examiner

UNITED STATES PATENTS 2,871,980  2/59  Allard _____ 184—3

FOREIGN PATENTS 342,255  12/59  Switzerland.

LAVERNE D. GEIGER, *Primary Examiner.*

MILTON KAUFMAN, *Examiner.*